March 19, 1940. W. R. WILEY 2,194,106
FRAME STRUCTURE AND ATTACHING CLIP
Filed Feb. 18, 1939 2 Sheets-Sheet 1
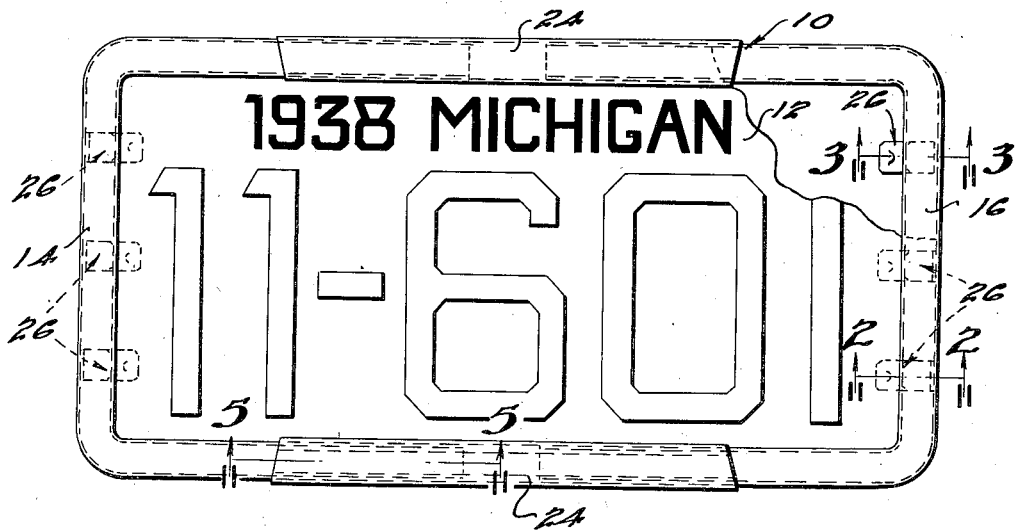
FIG. 1.
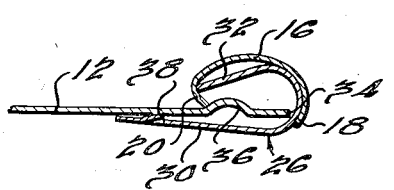 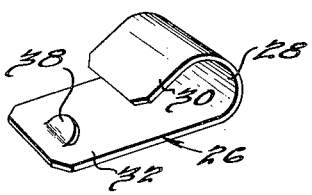 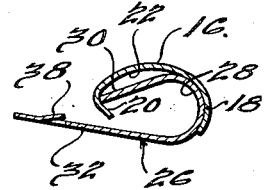
FIG. 2. FIG. 4. FIG. 3.
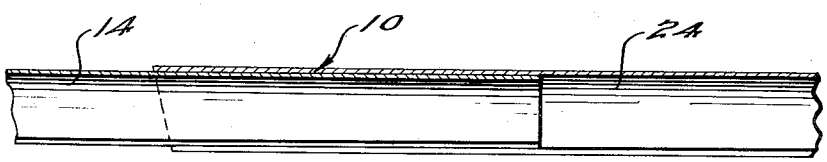
FIG. 5.
INVENTOR
William R. Wiley.
BY
Harness, Dickey & Pierce.
ATTORNEYS.

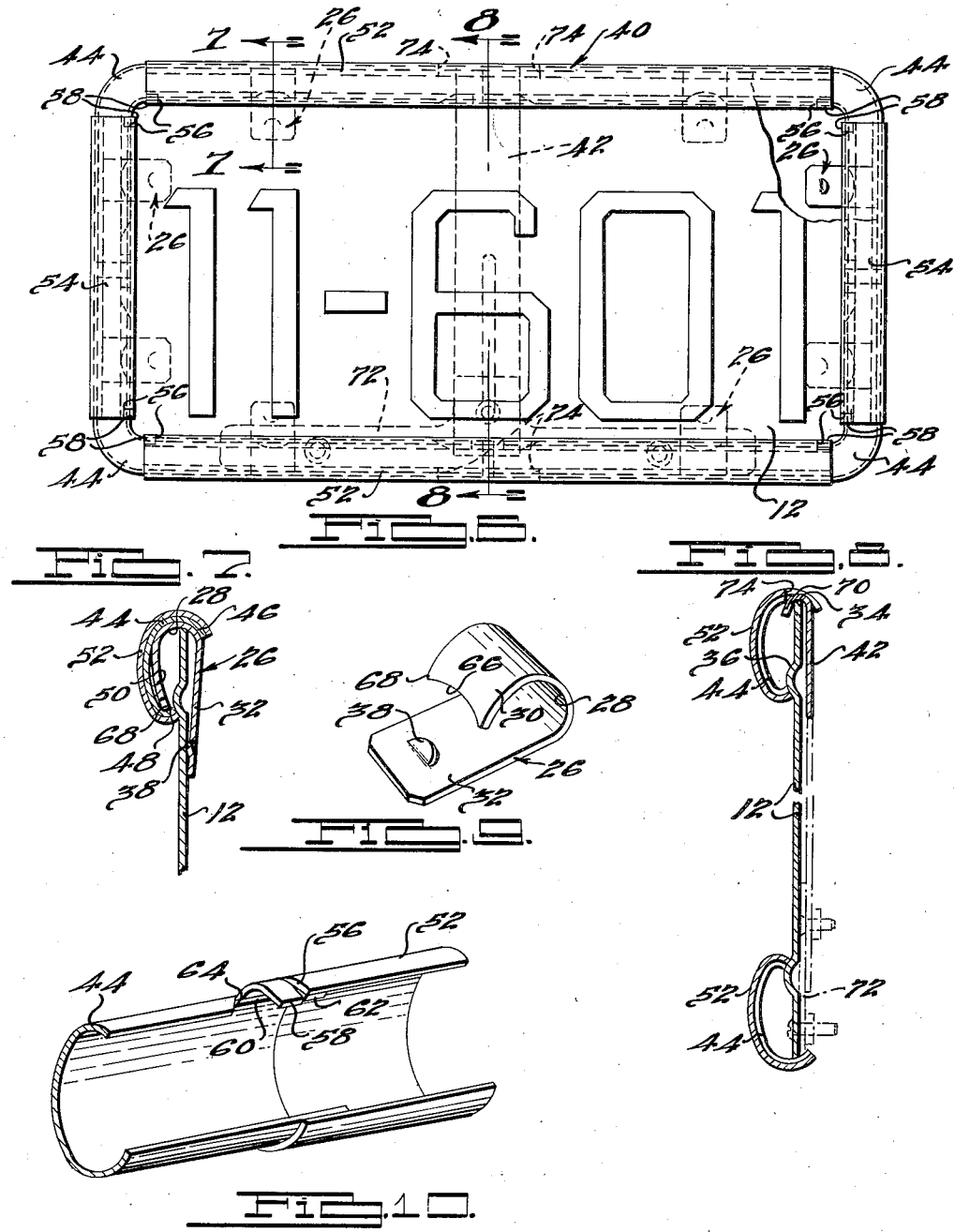

Patented Mar. 19, 1940

2,194,106

UNITED STATES PATENT OFFICE 2,194,106

FRAME STRUCTURE AND ATTACHING CLIP

William R. Wiley, Detroit, Mich.

Application February 18, 1939, Serial No. 257,083

8 Claims. (Cl. 40—125)

This invention relates to frame holders or supports for automobile license plates, or the like.

One of the primary objects of the present invention is to provide an improved frame construction in combination with improved means for supporting a license plate or the like.

Another object of the invention is to provide an improved and simplified manner of attaching a license plate to an adjustable frame member.

Another object of the invention is to provide improved resilient clip means adapted to be positioned within the channels of channel-shaped frame members in which the clip means have tabs formed thereon which are adapted to bite into the surface of the plate attached to the frame so that the plate is fixed in position on the frame and the frame members may not separate from each other.

Another object of the invention is to provide an improved license plate holder or support which is economical to manufacture and easy to apply to the plate held therein.

Other objects of the invention will become apparent from the following specification, the drawings relating thereto and from the claims hereinafter set forth.

In the drawings, in which like numerals are used to designate like parts in the several views throughout:

Figure 1 is a front elevational view of a holder or supporting means according to the present invention having a license plate supported therein;

Fig. 2 is an enlarged cross-sectional view taken substantially along the line 2—2 of Fig. 1;

Fig. 3 is an enlarged cross-sectional view taken substantially along the line 3—3 of Fig. 1;

Fig. 4 is an enlarged perspective view of the clip means of the present invention;

Fig. 5 is an enlarged cross-sectional view taken substantially along the line 5—5 of Fig. 1;

Fig. 6 is a view similar to Fig. 1 illustrating a modified, preferred form of the present invention;

Fig. 7 is an enlarged cross-sectional view taken substantially along the line 7—7 of Fig. 6;

Fig. 8 is a broken, enlarged cross-sectional view taken substantially along the line 8—8 of Fig. 6;

Fig. 9 is a perspective view of a modified, preferred form of clip which may be used with the frame of Fig. 1, as well as the frame of Fig. 6; and Fig. 10 is an enlarged, partial perspective view of the frame elements used in Fig. 6, illustrating in detail the manner in which the frame elements are limited in their movement relative to each other.

Referring to the drawings, and referring particularly to Figs. 1 to 6 thereof, an adjustable frame is generally indicated at 10 which serves as a frame for a license plate 12 which may be connected in the usual way to the usual brackets provided on automobiles. The frame 10 includes oppositely disposed, U-shaped frame members 14 and 16 which are channel-shaped in cross-section. Each member 14 and 16 has an outer wall portion 18 and an inner wall portion 20. The wall portions 18 and 20 converge towards each other; and the outer wall portion 18 is preferably shaped into a smooth curve, while the inner wall portion 20 is bent inwardly at a sharper angle so that the edge of the wall 20 terminates inwardly of the edge of the wall 18. The walls 18 and 20 with the base of the channel form outwardly disposed channels indicated at 22 in the rear faces of the frame members.

Connecting frame members 24 which are also formed of sheet metal and are of channel section complementary to that of the channel section of the members 14 and 16 are provided. The legs of the U-shaped members 14 and 16 are adapted to be telescopically received within the members 24 so that the frame 10 is adjustable lengthwise and may readily accommodate license plates of different sizes.

In order to mount the license plate 12 to the frame member 10 and fix it thereon, clip means generally indicated at 26 are provided. The clips 26 are preferably formed of relatively high carbon steel and are heat treated or tempered in order to materially increase its hardness and resiliency and are preferably hardened sufficiently so that they are harder than the plate 12.

The clips 26 are shaped to provide a rounded or bowed base portion 28 having leg portions 30 and 32 extending in the same direction from the base. The base 28 preferably has substantially the same curvature as the inner surface of the wall 18 and the leg 30 is adapted to be positioned within the channel 22 and extend into engagement with the inner wall 20. The leg 30 converges at a rather sharp angle towards the leg 32 and terminates short of the length of the leg 32 so that the leg 32 is substantially longer than the leg 30 and preferably extends inwardly beyond the inner wall 20. According to the broader aspects of the invention, it is not necessary that the leg extend inwardly beyond the wall 20 but that is preferable.

The clip 26 may be readily inserted within the channel 22 by positioning the outer edge of the leg 30 under the wall or flange 20 at the desired position along the channel and springing the curved base 28 against the wall 18 within the channel. A suitable number of such clips may be positioned within the channels with suitable spaces therebetween. The position of the clips before the plate is inserted is best shown in Fig. 3, and it can be seen that the leg 32 extends toward the frame members and also extends inwardly toward the center of the frame beyond the inner edges of the frame members. The clips are preferably positioned in the bases of the end members 14 and 16, or in the ends of the frame 10, as shown in Fig. 1.

The ends 34 of the plate 12 are then adapted to be received within the clip as shown in Fig. 2. The ends 34 are adapted to extend to a position closely adjacent the inner surface of the bases 28; and such plates are generally provided with ribs 36 therearound adjacent the edges. Such ribs also extend within the channel 22 and are engaged by the edge of the wall 20 to further assist in holding the plate in position. The legs 32 of the clip resiliently bear against the back face of the plate 12 and urge the plate against the frame members and particularly against the walls 20. When the plate is so positioned, the legs 30 and 32 are, of course, tensioned in the position shown in Fig. 2 so that the plate is firmly locked relative to the frame.

In order to further lock the plate 12 in position and to provide against separation of the frame members 14 and 16, the legs 32 of the clip are each provided with an in-struck tab 38 which slopes inwardly toward the base 28. Such in-struck tab being of a metal harder than the metal of the plate 12, bites into the back surface thereof and fixes the plate 12 relative to each one of the clips 26. It is relatively easy to insert the ends of the plate 12 between the leg 32 and the back faces of the frame members at both ends of the frame to the position shown in Fig. 2, but the lug or tab 38 will prevent the separation of the frame members and will firmly lock the plate 12 in position. While the ribs 36 provided on the plate 12 are helpful in holding the plate 12 in position, such ribs 36 are not necessary as the construction of the clips 26 with the tabs 38 serves to fix the plate 12 so that it will not work loose from the frame.

Referring to Figs. 6 to 10 of the drawings, a modified, preferred form of structure is illustrated. An adjustable frame is generally indicated at 40 which serves as a frame for a license plate 12, which plate may be connected in the usual way to the usual bracket 42 provided on automobiles. The frame 40 includes four corner frame members 44, each of which is preferably formed to provide a right angle corner and each of which is channel-shaped in cross-section, similar to the members 14 and 16 above described. Each member 44 has an outer wall portion 46 and an inner wall portion 48, in which the wall portions 46 and 48 converge toward each other; and the outer wall portion 46 is preferably shaped into a smooth curve, while the inner wall portion 48 is bent inwardly at a sharper angle so that the edge of the wall 48 terminates inwardly at the edge of the wall 46. The walls 46 and 48 with the base of the channel form outwardly disposed channels indicated at 50 in the rear faces of the frame members.

Top and bottom connecting frame members 52 and end connecting frame members 54 are provided which are substantially straight and are formed of sheet metal of channel-section complementary to that of the channel-section of the members 44. The ends of the corner members 44 are adapted to be telescopically received within the ends of their adjacent members 52 and 54 so that the frame 40 is adjustable widthwise and lengthwise and may readily accommodate license plates of different sizes.

In order to limit the extent to which the frame members may be extended, the straight sections 52 and 54 are sheared along lines 56 at each end of the inner edges thereof to provide inwardly bent tabs 58. Notches 60 are cut out of the corner members 44 on the inner edges spaced slightly inwardly from each end thereof to provide tabs 62 against which the tabs 58 are adapted to abut when the frame members are extended. This limits the extent to which the frame members may be extended. The inner edges 64 of the slot 60 are sloped away from the tabs 62; and as the tabs 58 are resilient, they will slide up over its edges 64 when the frame members are compressed.

In order to mount the license plate 12 to the frame member 40 and fix it thereon, clip means, generally indicated at 26, and which are generally similar to the clip means described above, are provided. The only difference between the clip illustrated in Fig. 9 and that illustrated in Fig. 4 is that the outer edge of leg 30 is cut out along line 66 to provide prongs 68 which bite into the inner surface of the wall 48 so that the clip is fixed longitudinally of the channel and cannot be moved relative thereto, either when it is initially positioned or after the license plate is fixed in position. The clip may be positioned along the top and bottom and ends of the frame and it can be seen that the leg 32 extends inwardly toward the center of the frame preferably beyond the inner edges of the frame members.

The license plate 12 is adapted to be positioned in the frame in a manner generally similar to that described above so that the peripheral edge 36 of the plate extends to a position closely adjacent the inner surfaces of the bases 28. The rib 36 is adapted to be engaged by the edges of the wall 48 in the same manner as that described above. The frame members may be closed so that the plate is engaged on all of its four sides; and when the plate is so positioned, the legs 30 and 32 of the clip are tensioned so that the tabs 38 bite into the rear surface of the plate 12 and firmly lock the frame relative to the plate.

The mounting bracket 42 is of conventional construction and is of the type usually provided on automobiles. It includes an upright member terminating in a hooked end 70 adjacent the top thereof with a horizontal member 72 which may be adjustably fixed along the length of the upright member of the bracket. The plate is adapted to be attached to the horizontal bracket 72 by means of suitable bolts and the hooked end 70 is adapted to extend over the top edge of the plate 34. In order to accommodate the hooked end 70 and so that it will not be within the line of normal vision, a slot 74 is cut out of the top edge of the top member 52 at substantially the middle of the frame and is adapted to receive the hooked end 70. The frame may then be pushed up over the hook so that it is not visible. In some automobiles the bracket 42 is turned upside down from that illustrated so that the hook would be at the bottom of the frame. A similar slot 74 is provided in the outer edge of the bottom frame member 52 so that the hook may be accommodated within this slot when it is turned upside down from that illustrated.

Formal changes may be made in the specific embodiment of the invention described without departing from the spirit and substance of the invention the scope of which is commensurate with the appended claims.

What I claim is:

1. A device of the type described comprising, in combination, means forming a sheet metal frame adapted to have a plate fixed thereto, said means including a sheet metal member channel-shaped in cross-section, and clip means disposed within the channel of said member, said clip means being formed of a metal strip having a bowed base engaging the outer wall of the channel, a leg portion having its outer edge engaging the inner wall of said channel, and another leg portion extending in the same direction as said first named leg, said another leg portion having an in-struck tab, said another leg portion and said in-struck tab being so constructed and arranged as to engage said plate and resiliently urge said plate against said frame to fix said plate in position.

2. A device of the type described comprising, in combination, means forming a sheet metal frame adapted to have a plate fixed thereto, said means including a sheet metal member channel-shaped in cross-section, and clip means disposed within the channel of said member, said clip means being formed of a hardened and tempered metal strip having a base engaging the outer wall of the channel, a leg portion having its outer edge engaging the inner wall of said channel, and another leg portion extending in the same direction as said first named leg and extending inwardly beyond said inner wall, said another leg portion having an in-struck tab formed therein adapted to bite into the surface of said plate, said another leg portion and said in-struck tab being so constructed and arranged as to engage said plate and resiliently urge said plate against said frame to fix said plate in position.

3. A device of the type described comprising, in combination, means forming a sheet metal frame adapted to have a plate fixed thereto, said means including a sheet metal member channel-shaped in cross-section, the inner and outer walls forming said channel converging toward each other, the edge of said outer wall terminating outwardly beyond the edge of said inner wall and said inner wall converging inwardly at a greater angle than said outer wall, and clip means disposed within the channel of said member, said clip means being formed of a metal strip having a base engaging said outer wall, a leg portion having its outer edge engaging said inner wall, and another leg portion extending in the same direction as said first named leg and extending inwardly beyond said inner wall, so constructed as to engage said plate and resiliently urge said plate against said frame to fix said plate in position.

4. A device of the type described comprising, in combination, means forming an adjustable sheet metal frame adapted to have a plate fixed thereto, said means including sheet metal members of channel-shaped section telescopically mounted relative to each other, and clip means disposed within the channels at opposite ends of said frame, said clip means being formed of metal strips, each having a base engaging the outer wall of its respective channel, a leg portion having its outer edge engaging the inner wall of its respective channel, and another leg portion extending in the same direction as said first named leg and extending inwardly beyond said inner wall, so constructed as to engage said plate and resiliently urge said plate against said frame to fix said plate in position.

5. A device of the type described comprising, in combination, means forming an adjustable sheet metal frame adapted to have a plate fixed thereto, said means including sheet metal members of channel-shaped section telescopically mounted relative to each other, and clip means disposed within the channels at opposite ends of said frame, said clip means being formed of metal strips, each having a base engaging the outer wall of its respective channel, a leg portion having its outer edge engaging the inner wall of its respective channel, and another leg portion extending in the same direction as said first named leg and extending inwardly beyond said inner wall, said another leg portion having an in-struck tab formed thereon adapted to bite into the surface of said plate, said another leg portion and said tab being so constructed and arranged as to engage said plate and resiliently urge said plate against said frame to fix said plate in position.

6. A device of the type described comprising, in combination, means forming a sheet metal frame adapted to have a plate fixed thereto, said means including a sheet metal member channel-shaped in cross-section, and clip means disposed within the channel of said member, the inner and outer walls forming said channel converging toward each other, the edge of said outer wall terminating outwardly beyond the edge of said inner wall, and clip means disposed within the channel of said member, said clip means being formed of a metal strip having a base engaging said outer wall, a leg portion having its outer edge engaging said inner wall, said outer edge being formed with a prong thereon adapted to engage said inner wall, and another leg portion extending in the same direction as said first named leg, so constructed as to engage said plate and resiliently urge said plate against said frame to fix said plate in position.

7. A device of the type described comprising, in combination, means forming a sheet metal frame adapted to have a plate fixed thereto, said means including a sheet metal member channel-shaped in cross-section, the inner and outer walls forming said channel converging toward each other, and clip means disposed within the channel of said member, said clip means being formed of a metal strip having a base engaging said outer wall, a leg portion having its outer edge engaging said inner wall, said outer edge being formed to provide prong means thereon which engage said inner wall, and another leg portion extending in the same direction as said first named leg, said another leg portion having an in-struck tab formed thereon adapted to bite into the surface of said plate, said another leg portion and said in-struck tab being so constructed and arranged as to engage said plate and resiliently urge said plate against said frame to fix said plate in position.

8. A device of the type described comprising, in combination, means forming a closed sheet metal frame, said means including a plurality of sheet metal channel-shaped members adapted to be received in telescopic relation to each other, said members being movable relative to each other, and means to limit the movement of said members relative to each other, said last named means including means forming a resilient tab disposed inwardly of the surface of one of said members, and means forming a notch in another of said members adjacent to said first named member, the edge of said notch adjacent the leading end of said another of said members providing a shoulder which is adapted to abut against said tab to limit movement between said members and the opposite edge of said notch being sloped outwardly away from said shoulder to provide a cam edge to guide said tab out of said notch.

WILLIAM R. WILEY.